United States Patent
Lam et al.

(10) Patent No.: US 10,029,184 B2
(45) Date of Patent: Jul. 24, 2018

(54) PLUG-IN TYPE CONTAINER

(71) Applicant: Meixin Manufacturing Co., Ltd., Guangdong (CN)

(72) Inventors: Cliff Lam, Humble, TX (US); Terry Lam, Humble, TX (US); Richard Lam, Humble, TX (US)

( * ) Notice: Subject to any disclaimer, the term of this patent is extended or adjusted under 35 U.S.C. 154(b) by 0 days.

(21) Appl. No.: 14/824,584

(22) Filed: Aug. 12, 2015

(65) Prior Publication Data

US 2016/0046405 A1 Feb. 18, 2016

(30) Foreign Application Priority Data

Aug. 12, 2014 (CN) ..................... 2014 2 0452410 U

(51) Int. Cl.
*A63G 31/00* (2006.01)
*A01G 9/02* (2018.01)
*A63H 33/32* (2006.01)

(52) U.S. Cl.
CPC ............... *A63G 31/00* (2013.01); *A01G 9/02* (2013.01); *A63H 33/32* (2013.01)

(58) Field of Classification Search
CPC .......... A63G 31/00; A63H 33/32; A01G 9/02; B65D 9/12; B65D 7/24; B65D 11/1873; B65D 11/22
See application file for complete search history.

(56) References Cited

U.S. PATENT DOCUMENTS

| | | | | |
|---|---|---|---|---|
| 1,378,197 A | * | 5/1921 | Schwab | B65D 9/32 217/65 |
| 1,673,324 A | * | 6/1928 | Gardner | B65D 7/24 217/12 R |
| 1,828,088 A | * | 10/1931 | Robinson | B65D 7/24 220/4.33 |
| 1,932,772 A | * | 10/1933 | Eschenbach | B65D 7/12 217/12 R |
| 2,456,929 A | * | 12/1948 | Dee | B65D 21/0224 211/126.12 |
| 2,655,283 A | * | 10/1953 | Moldt | B65D 21/045 206/507 |
| 2,775,360 A | * | 12/1956 | Phillips | B65D 19/12 108/53.5 |
| 3,182,846 A | * | 5/1965 | La Kaff | A47B 47/03 108/156 |

(Continued)

*Primary Examiner* — Ernesto Grano
(74) *Attorney, Agent, or Firm* — Osha Liang LLP

(57) ABSTRACT

A plug-in type container including: a bottom plate configured to prevent leaking through the container bottom; side walls; and side columns. The bottom plate, the side walls and the side columns are connected in a plug-in manner to form a trough body. The bottom plate and the side columns are provided with plug-in structures configured to engage with each other. The side columns and the side walls are provided with plug-in structures configured to engage with each other. The plug-in type container is formed by connecting the bottom plate, the side columns and the side walls in a plug-in manner. The components are plate-like or columnar structures and can be directly stacked for packing, thereby occupying little space and convenient to transport and carry. Moreover, assembly of the container can be done in a simple manner, thus a common consumer can assemble the container without using tools or screws.

9 Claims, 4 Drawing Sheets

(56) References Cited

U.S. PATENT DOCUMENTS

| | | | | |
|---|---|---|---|---|
| 3,266,656 A | * | 8/1966 | Kridle | B65D 9/12 220/4.28 |
| 3,477,604 A | * | 11/1969 | Kridle | B65D 9/12 217/12 R |
| 3,692,201 A | * | 9/1972 | Garduna | B65D 9/34 217/12 R |
| 3,736,035 A | * | 5/1973 | Brown | A47B 97/001 312/107 |
| 3,927,821 A | * | 12/1975 | Dunning | B65D 5/56 229/164.2 |
| 3,955,702 A | * | 5/1976 | Lundy | F21S 8/088 220/4.28 |
| 4,210,274 A | * | 7/1980 | Leonard | B65D 5/006 229/198.1 |
| 4,609,116 A | * | 9/1986 | Simms | B65D 9/12 206/600 |
| 4,643,314 A | * | 2/1987 | Kidd | B65D 19/06 206/386 |
| 4,673,087 A | * | 6/1987 | Webb | B65D 11/1873 16/225 |
| 4,955,158 A | * | 9/1990 | Lyon | A01G 27/04 47/79 |
| 5,236,099 A | * | 8/1993 | Fties | B65D 19/0016 220/4.31 |
| D347,092 S | * | 5/1994 | Ravel | D30/118 |
| 5,386,978 A | * | 2/1995 | Ladwig | A47J 47/005 269/289 R |
| 5,392,915 A | * | 2/1995 | Kalin | B65D 25/06 206/503 |
| 5,413,236 A | * | 5/1995 | Kenevan | B65D 11/18 220/23.4 |
| 5,497,895 A | * | 3/1996 | Rudbach | B65D 9/12 220/4.33 |
| 5,529,199 A | * | 6/1996 | Foster | B65D 7/24 220/4.28 |
| 5,638,973 A | * | 6/1997 | Dewey | B65D 11/1873 206/509 |
| 5,642,830 A | * | 7/1997 | Foster | B65D 7/24 220/4.28 |
| 5,720,403 A | * | 2/1998 | Sawyer | B65D 9/32 217/13 |
| 5,722,551 A | * | 3/1998 | Cocciemiglio, Jr. | B65D 9/24 220/4.33 |
| 6,142,329 A | * | 11/2000 | Dotan | B65D 19/18 220/4.33 |
| 6,832,580 B2 | * | 12/2004 | Marchioro | A01K 1/0245 119/452 |
| 6,966,449 B2 | * | 11/2005 | Williams | B65D 11/1873 206/509 |
| H002183 H | * | 3/2007 | Wood | B65D 11/10 220/1.5 |
| 8,029,880 B2 | * | 10/2011 | Liu | E04B 5/12 428/33 |
| 8,112,859 B2 | * | 2/2012 | Vroon | B29C 45/0055 206/499 |
| 8,403,723 B1 | * | 3/2013 | Haner | A63H 33/08 446/120 |
| 8,640,911 B2 | * | 2/2014 | Hardigg | B65D 11/10 206/508 |
| 8,997,319 B2 | * | 4/2015 | Jenson | A61G 17/00 229/101 |
| 2002/0040903 A1 | * | 4/2002 | Coones | B65D 9/12 220/4.33 |
| 2002/0053120 A1 | * | 5/2002 | Cox | A61G 17/00 27/4 |
| 2004/0074190 A1 | * | 4/2004 | Lin | B32B 3/10 52/592.1 |
| 2004/0124191 A1 | * | 7/2004 | Colladon | B65D 21/083 220/4.01 |
| 2004/0232145 A1 | * | 11/2004 | Antal, Sr. | B65D 11/1873 220/4.33 |
| 2004/0244288 A1 | * | 12/2004 | Kirkpatrick | A01G 9/02 47/66.3 |
| 2005/0155287 A1 | * | 7/2005 | Phillips | A01G 9/02 47/66.1 |
| 2006/0076349 A1 | * | 4/2006 | Chen | B65D 11/1873 220/6 |
| 2007/0277476 A1 | * | 12/2007 | Macleod | E04B 2/58 52/787.1 |
| 2011/0247268 A1 | * | 10/2011 | Adams | A01G 9/1423 47/66.1 |
| 2013/0180174 A1 | * | 7/2013 | MacKenzie | A01G 1/002 47/65.7 |
| 2014/0325904 A1 | * | 11/2014 | Brown | A01G 9/02 47/65.5 |
| 2014/0326719 A1 | * | 11/2014 | Huang | B65D 7/24 220/4.28 |
| 2015/0048084 A1 | * | 2/2015 | Heyman | B65D 11/1873 220/4.28 |
| 2015/0284135 A1 | * | 10/2015 | Chinni Vergottini | B29C 45/0017 206/503 |
| 2016/0316637 A1 | * | 11/2016 | Leone | A01G 27/06 |

* cited by examiner

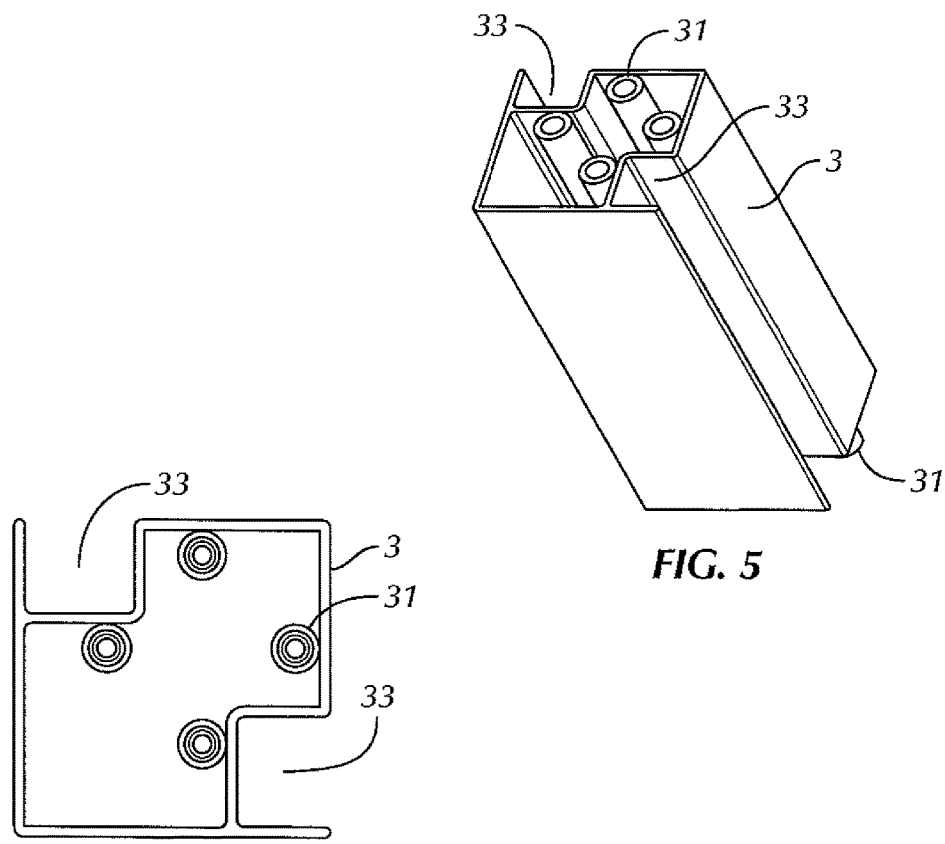
FIG. 5
FIG. 6
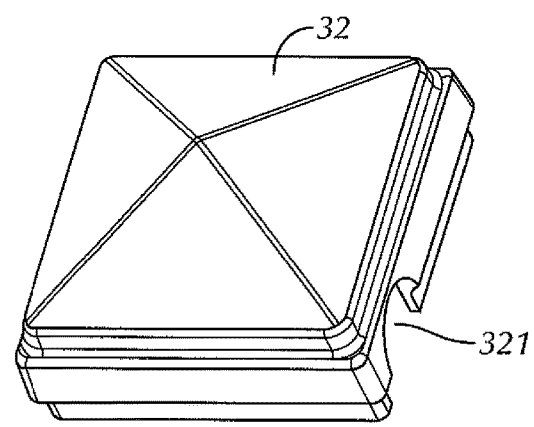
FIG. 7

PLUG-IN TYPE CONTAINER

FIELD OF THE INVENTION

The present disclosure relates to a container.

BACKGROUND

Existing flowerpots usually have pot bodies with fixed shapes and are used for growing plants to decorate courtyards. However, this kind of flowerpots generally have fixed shapes of a rectangular trough or circular trough, and thus are difficult to transport and carry.

SUMMARY

An objective of the present disclosure is to provide a plug-in type container. The plug-in type container is formed by connecting a plurality of components in a plug-in manner, is convenient to assemble without using any tool or screw and is easy to transport and carry. The plug-in type container can be used as a planter for growing plants and a sand pit for children play, etc.

An objective of the present disclosure is achieved by the following technical solutions:

A plug-in type container comprises: a bottom plate configured to prevent a container content from leaking through the bottom of the container; side walls; and side columns, wherein the bottom plate, the side walls and the side columns are connected in a plug-in manner to form a trough body, and the bottom plate and the side columns are provided with plug-in structures for engaging with each other, and the side columns and the side walls are provided with plug-in structures for engaging with each other.

The bottom plate can include a grid-type bottom support layer, and a sheet layer for preventing the container content from leaking through the bottom of the container is laid on the bottom support layer. The sheet layer laid on the grid-type bottom support layer allows the container to hold such granular tiny objects as sand, soil, etc.

The bottom support layer can be formed by connecting a plurality of grid-type bottom supports in a plug-in manner, and adjacent bottom supports can be provided with plug-in structures configured to engage with each other.

The sheet layer can be a plastic sheet layer.

Further, pores can be formed in the plastic sheet layer. The pores formed in the sheet layer allows the container to hold soil for growing plants. In this case, the pores are used for enabling excessive water in the soil to flow out through the bottom of the container, so as not to soak the roots of the plants in the water. When the pores are formed on the sheet layer, the container can also be used as a sand pit placed outdoors for children play, and after rain, rainwater can flow out through the bottom of the container via the pores so as not to remain in the container.

Preferably, the diameters of the pores are in the range from about 0.5 mm to about 1.0 mm.

More preferably, the diameters of the pores are about 0.8 mm.

The bottom plate can be rectangular. The side columns are connected to the four corners of the bottom plate in a plug-in manner and the four side walls are connected with the side columns in a plug-in manner. Thus, a rectangular trough body is formed.

Further, each of the side columns can be a square column body with a rectangular cross section, and side wall plug-in parts are provided on two adjacent column walls of the column body for connecting to the side walls of the container in a plug-in manner.

Even further, at least one protruding column is provided at the bottom of each of the side columns A protruding column plug-in part for engaging with the protruding column is provided on the bottom plate, and the protruding column is inserted in the protruding column plug-in part.

Preferably, four protruding columns are provided for each of the side columns, and are arranged to form a rectangle and longitudinally penetrate through the side columns, and the tops of the protruding columns are unsealed.

A cover body can be further connected to the side columns in a plug-in manner.

The top and the bottom of each of the side walls in section are arcs, and the directions and sizes of the two arcs are the same.

The present disclosure has the following beneficial effects:

1. The plug-in type container according to the present disclosure is formed by connecting the bottom plate, the side columns and the side walls in a plug-in manner. The components are plate-like or columnar structures and can be directly stacked for packing, thereby occupying little space and being convenient to transport and carry. Moreover, the assembly of the container can be done in a simple manner, thus a common consumer can assemble the container by himself without using any tool or screw. The container can be used as a sand pit for children play, and when pores are formed in the sheet layer, the sand pit can be placed outdoors for a long time and can be used for growing plants, and so on.

2. When it is unnecessary or unsuitable for growing plants, or when the sand pit needs to be packed up, the container can be easily disassembled and thus occupies very little space when being stored.

3. The bottom plate of the plug-in type container according to the present disclosure is a bottom support layer formed by connecting a plurality of pored bottom supports in a plug-in manner. When the container is used for growing plants, the bottom plate has certain supporting strength for the soil filled in the container, and the porous sheet laid thereon is used as a water retention and water seepage layer. The diameters of the pores are set in such a manner that after soil is filled in the container, water in the soil will not leak too fast, and when excessive water is accumulated in the soil in the container due to irrigation or rain, the excessive water can seep through the bottom plate so as not to soak the roots of the plants in water to result in rotted roots; when the container used as sand pit is placed outdoors, the sheet layer provided with the pores can ensure rainwater in the sand pit to flow away through the bottom without remaining in the container after rain.

4. The bottom support of the plug-in type container according to the present disclosure can be the bottom support proposed by the applicant in a Chimes patent application with a patent application No. CN201310569491.7, entitled "FLOOR ASSEMBLY". The bottom support can be spliced to a desired size depending on actual demand and can also be used in combination with the floor assembly described in the patent "FLOOR ASSEMBLY" (patent application No. CN201310569491.7).

5. The side columns and the side walls of the plug-in type container according to the present disclosure can be connected and stacked up and down, so that the height of the plug-in type container according to the present disclosure can be increased as desired, and thus the application of the container is more flexible.

BRIEF DESCRIPTION OF THE DRAWINGS

FIG. 5 is a schematic diagram of a side column of the plug-in type container according to the present disclosure.

FIG. 6 is a schematic diagram of a cross section of a side column of the plug-in type container according to the present disclosure.

FIG. 7 is a structure diagram of a top cover of the plug-in type container according to the present disclosure.

DETAILED DESCRIPTION

A detailed illustration of embodiments of the present disclosure will be given below with reference to the accompanying drawings.

Figure 1:
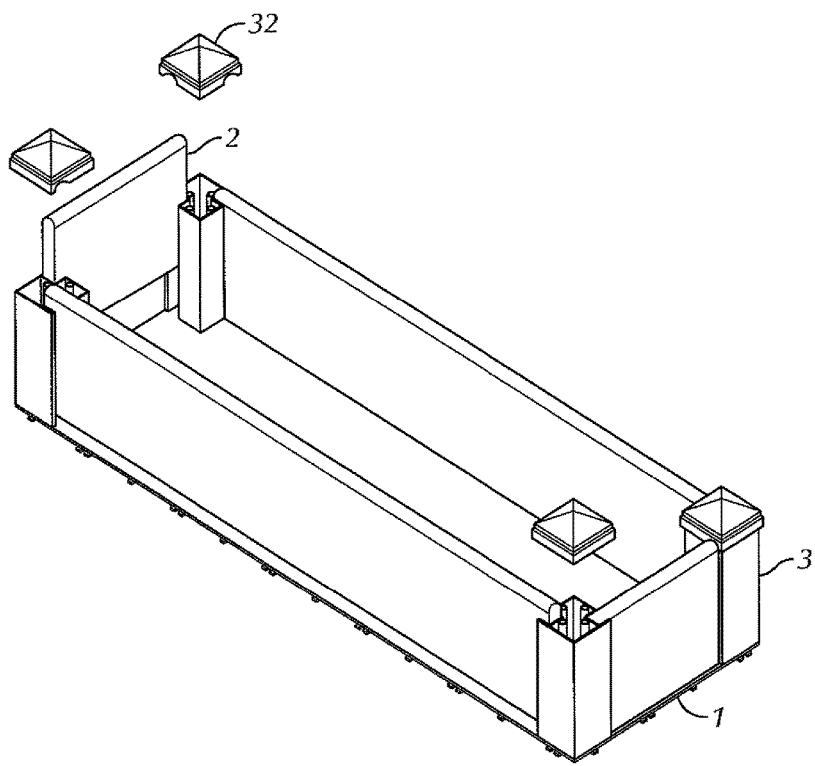
FIG. 1 is a schematic diagram of assembly of a plug-in type container according to the present disclosure.
Figure 2:
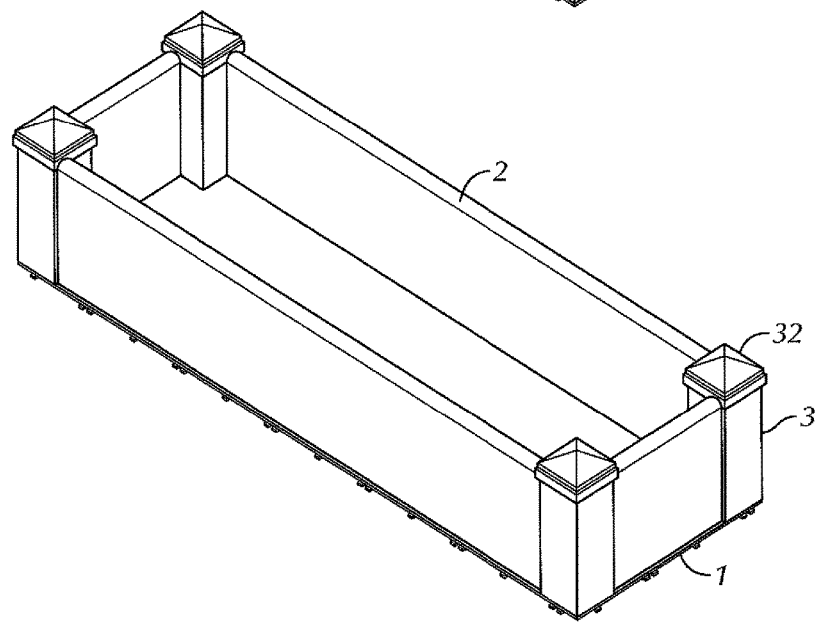
FIG. 2 is a schematic diagram of an overall structure of the plug-in type container according to the present disclosure.
Figure 3:
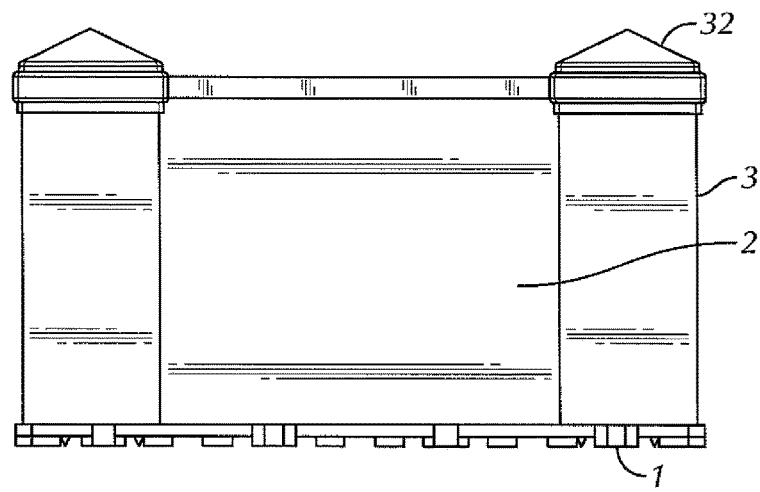
FIG. 3 is a side view of the plug-in type container according to the present disclosure.
Figure 4:
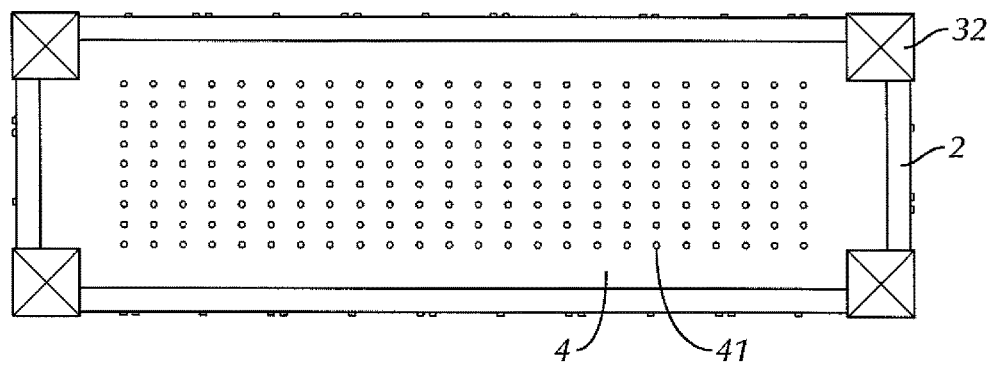
FIG. 4 is a top view of the plug-in type container according to the present disclosure.
Figure 8:
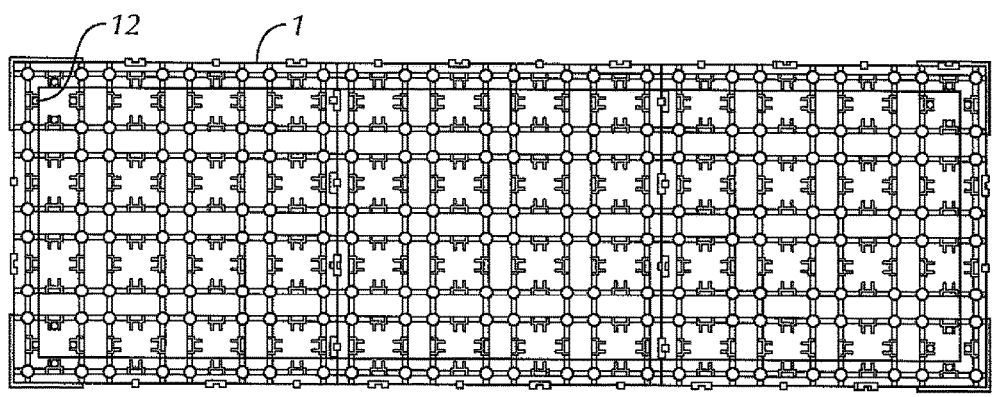
FIG. 8 is a structure diagram of a bottom support layer of the plug-in type container according to the present disclosure.
Figure 9:
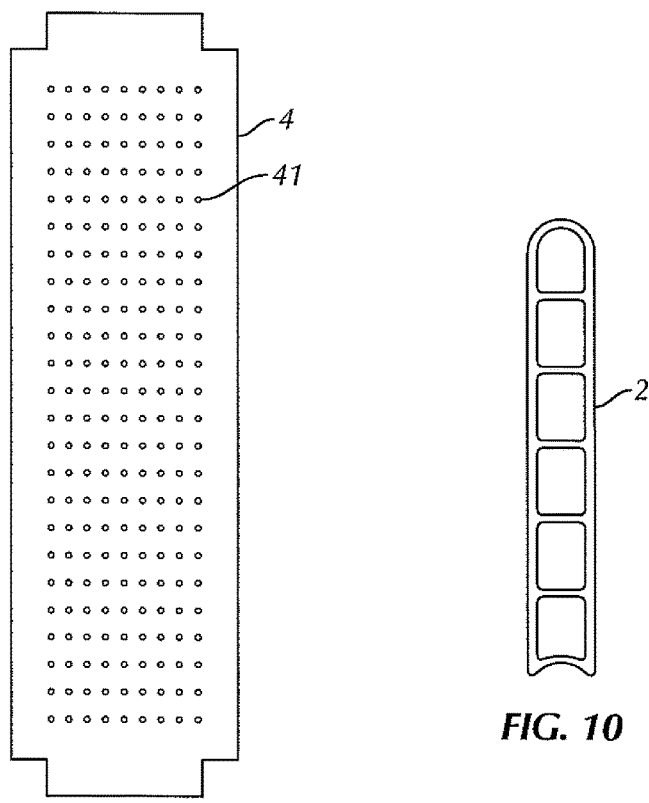
FIG. 9 is a schematic diagram of a water retention and water seepage layer of the plug-in type container according to the present disclosure.
Figure 10:
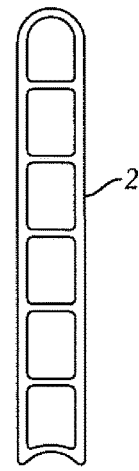
FIG. 10 is a sectional view of a side wall of the plug-in type container according to the present disclosure.

As shown in FIGS. 1-10, a plug-in type container includes a bottom plate capable of preventing a container content from leaking through the bottom of the container, and further includes side walls and side columns, wherein the bottom plate, the side walls 2 and the side columns 3 are connected in a plug-in manner to form a trough body, and the bottom plate and the side columns 3 are provided with plug-in structures configured to engage with each other, and the side columns 3 and the side walls 2 are provided with plug-in structures configured to engage with each other.

The bottom plate includes a square grid-type bottom support layer capable of supporting contents in the trough body. A plastic sheet layer 4 having pores is laid on the bottom support layer, and the diameters of the pores 41 are about 0.8 mm. The bottom support layer according to the present embodiment is formed as a rectangle by connecting three square grid-type bottom supports 1 in a plug-in manner. Each bottom support 1 is the bottom support proposed by the applicant in a Chinese patent application with a patent application No. CN201310569491.7, entitled with "FLOOR ASSEMBLY", and the three square bottom supports 1 are connected to form the bottom of the rectangular container.

Four side columns 3 are connected to the four corners of the bottom support layer in a plug-in manner, and both ends of each of the four side walls 2 are inserted into the side wall plug-in parts of the side columns 3 to form a rectangular trough body shape. Four protruding columns 31 are provided on the bottom of each of the side columns 3, are arranged to form a rectangle and longitudinally penetrate through the side column 3, and the tops of the protruding columns 31 are unsealed. Protruding column plug-in parts 12 to be engaged with the protruding columns 31 are provided on the bottom support 1. The protruding columns 31 are inserted into the protruding column plug-in parts 12 so as to connect the side columns 3 with the bottom support 1 in a plug-in manner. In addition, each of the side columns 3 is a square column body with a rectangular cross section. Side wall plug-in parts 33 are provided on two adjacent column walls of the column body for connecting to the side walls 2 in a plug-in manner, and the opening directions of the two side wall plug-in parts 33 form an angle of 90 degrees. The two side walls 2 are respectively inserted into the two side wall plug-in parts 33 of the side column 3. After the four side walls and the four side columns are connected in a plug-in manner, the entire container in formed as a rectangular trough body.

A cover body 32 is further connected to the top of each side columns 3 in a plug-in manner. Each cover body 32 is a pyramid with a square bottom and covers the top of the side columns 3 to prevent rainwater or irrigated water from entering into the side columns 3 and to improve the container's aesthetic appearance.

In addition, the sections of the top and the bottom of each of the side walls 2 are arcs, and the directions and sizes of the two arcs are the same so that the side walls can be stacked up and down to increase the height by twice or more. The protruding columns of each of the side columns longitudinally penetrate through the entire side column so that the side columns can be connected up and down in a plug-in manner by inserting the protruding columns on the bottom of an upper side column into the unsealed openings at the top ends of the protruding columns on the tops of a lower side column. Thus, the height of the side columns can be increased by twice or more. Due to the design that the side walls and the side columns can be connected and stacked up and down, the height of the final container formed in a plug-in manner can be increased by twice or more.

The steps for assembling the container include: connecting the three grid-type bottom support layers 1 in a plug-in manner to form the bottom support layer; respectively inserting the protruding columns 31 of the four side columns 3 into the protruding column plug-in parts 12 on the four corners of the bottom support layer; then inserting the side walls 2 into the side wall plug-in parts 33 of the side columns 3; after the insertion, aligning the cover body 32 by two bayonets 321; and covering the side columns with the cover bodies, wherein the bayonets 321 just seal the grooves on the side columns 3 for inserting the side walls 2, and thus the side walls 2 are fixed in the entire structure; finally, placing the water retention and water seepage layer on the bottom of the container. In this way, soil can be filled in the container for growing plants. Of course, the container can also be filled with sand to serve as a sand pit for children play.

In addition, when a consumer needs a container with a larger height, the side walls and the side columns can be connected or stacked up and down in an assembly process. Said in another way, the height of the container can be increased freely.

The bottom of the container in the present embodiment is formed by connecting 3×1 square bottom supports into a rectangle. In other embodiments, 2×2, 2×1, 3×3 or other numbers of square bottom supports can be spliced to dimensions and sizes as desired according to actual demand, and the side walls can be tailored to proper lengths depending on preset dimensions of the bottom plate.

The above embodiment merely expresses an implementation of the present disclosure. The description is very specific and detailed, but should not be construed as restriction to the scope of the invention. Any technical solutions obtained by adopting equivalent substitutions or equivalent modifications shall fall within the scope of the invention.

What is claimed is:

1. A plug-in type container, comprising:
   a bottom plate, configured to prevent a container content from leaking through the bottom of the container;
   side walls (2); and
   side columns (3),
   wherein the bottom plate, the side walls (2), and the side columns (3) are connected in a plug-in manner to form a trough body, and the bottom plate and the side columns are provided with plug-in structures configured to engage with each other, and the side columns and the side walls are provided with plug-in structures configured to engage with each other;
   wherein the bottom plate is rectangular, the side columns (3) are connected to the four corners of the bottom plate in a plug-in manner, and four side walls (2) are connected to the side columns (3) in a plug-in manner, thereby forming a rectangular trough body shape;
   wherein each of the side columns (3) is a square column body with a rectangular cross section, and two adjacent column walls of the column body are provided with side wall plug-in parts (33) for engaging with the side walls of the container
   wherein at least one protruding column (31) is provided at the bottom of each of the side columns (3), a protruding column plug-in part (12) for engaging with the protruding column (31) is provided on the bottom plate, and the protruding column (31) is inserted in the protruding column plug-in part (12); and
   wherein four protruding columns (31) are provided for each of the side columns, and are arranged to form a rectangle and longitudinally penetrate through the side column (3), and the tops of the protruding columns (31) are unsealed.

2. The plug-in type container of claim 1, wherein the bottom plate comprises a grid-type bottom support layer, and wherein a sheet layer (4) for preventing the container content from leaking through the bottom of the container is laid on the bottom support layer.

3. The plug-in type container of claim 2, wherein the bottom support layer is formed by connecting a plurality of grid-type bottom supports (1) in a plug-in manner, and wherein adjacent bottom supports (1) are provided with plug-in structures configured to engage with each other.

4. The plug-in type container of claim 2, wherein the sheet layer (4) is a plastic sheet layer.

5. The plug-in type container of claim 4, wherein pores (41) are formed in the plastic sheet layer.

6. The plug-in type container of claim 5, wherein the diameters of the pores (41) are in a range of from about 0.5 mm to about 1.0 mm.

7. The plug-in type container of claim 6, wherein the diameters of the pores (41) are about 0.8 mm.

8. The plug-in type container of claim 1, wherein a cover body (32) is further connected to each of the side columns (3) in a plug-in manner.

9. The plug-in type container of claim 1, wherein the top and the bottom of each of the side walls in section are arcs, and the directions and sizes of the two arcs are the same.

* * * * *